US010902089B2

(12) United States Patent
Forster

(10) Patent No.: US 10,902,089 B2
(45) Date of Patent: Jan. 26, 2021

(54) METHOD FOR PREDICTING STOCHASTIC OUTPUT PERFORMANCE OR SCALING STOCHASTIC INPUTS

(71) Applicant: Government of the United States, as represented by the Secretary of the Air Force, Wright-Patterson, AFB, OH (US)

(72) Inventor: Edwin E Forster, Springboro, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 243 days.

(21) Appl. No.: 15/984,755

(22) Filed: May 21, 2018

(65) Prior Publication Data

US 2018/0336166 A1 Nov. 22, 2018

Related U.S. Application Data

(60) Provisional application No. 62/509,220, filed on May 22, 2017.

(51) Int. Cl.
*G06F 17/18* (2006.01)
*G06F 7/58* (2006.01)
(Continued)

(52) U.S. Cl.
CPC .............. *G06F 17/18* (2013.01); *G06F 7/582* (2013.01); *G06F 17/145* (2013.01); *G06F 30/20* (2020.01);
(Continued)

(58) Field of Classification Search
CPC ........................................................ G06F 17/18
(Continued)

(56) References Cited

U.S. PATENT DOCUMENTS

| 6,477,481 B1 | 11/2002 | Umeno |
| 6,850,874 B1 | 2/2005 | Higuerey et al. |
| 7,467,170 B1 | 12/2008 | Chen et al. |
| 2005/0094863 A1* | 5/2005 | Bergman Reuter .... G06T 7/001 382/145 |
| 2008/0034339 A1* | 2/2008 | Lehner .................. G06F 30/398 716/136 |

(Continued)

FOREIGN PATENT DOCUMENTS

JP    4184921 B2    6/2004

OTHER PUBLICATIONS

Pearl, J., "Application of Walsh Transform to Statistical Analysis," IEEE Trans. on Systems, Man, and Cybernetics, vol. SMC-1, No. 2, Apr. 1971, pp. 111-119.

(Continued)

*Primary Examiner* — Ricky Ngon
*Assistant Examiner* — Ricky Go
(74) *Attorney, Agent, or Firm* — AFMCLO/JAZ; Charles Figer, Jr.

(57) ABSTRACT

The invention provides a method for generating and analyzing random sample values. The method includes generating a random population array with a distribution and generating an array of random number coefficients by decomposing the random population array distribution using mean and variance. The array of random number coefficients is normalized and the normalized samples and antithetic samples may be mapped to the distribution of the random population array. The mapped, normalized samples and mapped normalized antithetic samples are arranged into a Walsh pattern.

16 Claims, 9 Drawing Sheets

(51) Int. Cl.
  *G06F 17/14* (2006.01)
  *G06N 7/08* (2006.01)
  *G06N 7/00* (2006.01)
  *G06F 30/20* (2020.01)
  *G06F 111/08* (2020.01)

(52) U.S. Cl.
  CPC ............... *G06N 7/005* (2013.01); *G06N 7/08* (2013.01); *G06F 2111/08* (2020.01)

(58) Field of Classification Search
  USPC ........................................................ 702/181
  See application file for complete search history.

(56) References Cited

U.S. PATENT DOCUMENTS

| | | | |
|---|---|---|---|
| 2015/0370931 A1* | 12/2015 | Haimi-Cohen | G06F 17/18 703/2 |
| 2016/0180007 A1* | 6/2016 | Svizhenko | G06F 17/18 716/132 |
| 2018/0089587 A1* | 3/2018 | Suresh | G06N 7/005 |
| 2018/0137415 A1* | 5/2018 | Steinberg | G06N 3/08 |

OTHER PUBLICATIONS

Yuen, C., "Comments on 'Application of Walsh Transform to Statistical Analysis'," IEEE Trans. on Systems, Man, and cybernetics, vol. SMC-1, No. 2, Apr. 1972, p. 294.

Walsh, J., "A Closed Set of Normal Orthogonal Functions," Am. J. of Mathematics, vol. 45, No. 1, Jan. 1923, pp. 5-24.

* cited by examiner

METHOD FOR PREDICTING STOCHASTIC OUTPUT PERFORMANCE OR SCALING STOCHASTIC INPUTS

CROSS-REFERENCE TO RELATED APPLICATIONS

This application claims the benefit of and priority to U.S. Provisional Application Ser. No. 62/509,220, entitled "Method for Predicting Stochastic Output Performance or Scaling Stochastic Inputs," filed on May 22, 2017, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates to generation of multiple sets of random numbers representing analytic stochastic quantities associated with probability/cumulative density functions, and their correlations with each other, and more particularly to efficient calculation of stochastic quantities of mean and variance of a multivariate function.

Description of the Related Art

Methods for calculating stochastic quantities of mean and variance of multivariate functions are well known. One such method is the Monte Carlo method. The Monte Carlo method provides approximate statistical solutions to a function by performing an evaluation, or simulation, utilizing a population of samples representing the distributed nature of the variates. The resulting population of the output is then statistically characterized. Accuracy of the Monte Carlo method typically requires a large number of sample evaluations to ensure convergence. Methods to enforce correlations of large sample sets may require substantial computational resources and still produce errors in the final sample set stochastic quantities of interest.

Contemporary methods for generating population arrays include Pseudo-Random, Quasi-Random, and Latin Hypercube Sampling. These methods all retain some amount of error between the population statistics of the input arrays and the original input stochastic quantities of interest. These errors propagate through the function evaluation or simulation and present errors in the population statistics of the output array.

Accordingly, there is a need in the art, to provide a method for generating multiple population arrays assembled from random numbers that more accurately characterize the stochastic quantities of interest of the input variates while reducing the number of samples required to achieve a desired level of statistical accuracy of the stochastic quantities of interest of the output function.

SUMMARY OF THE INVENTION

Embodiments of the invention provide an efficient method to calculate stochastic quantities of interest, mean and variance, for observed output performance behavior based on a linear combination of distributed linear input variables. The embodiments of the invention address the challenge of characterizing the mean and variance of the product of N independent distributed input variables, as well as the addition and subtraction of any sub-set product variables. These embodiments assist in providing a result that is as accurate as analytic methods, but with much less burden. These embodiments additionally assist in providing a result that is much more accurate than sampling methods, such as Monte Carlo simulation, but with much less computational burden. Moreover, the methodology may be reversed to determine either scaling of input variables (for linear independent distributed variables with constant coefficient of variation), or combination of terms that best characterize the statistical process (where scale of individual variables is known within the relationship). The method may be implemented into a device to form a "stochastic calculator", or incorporated into software. The method may be linked to any process, such as an experiment, to visually demonstrate upper and lower bounds (for example, ±1 standard deviation) of a measured performance behavior compared to a model with stochastic input variables.

In addition, embodiments of the invention provide a method for generating multiple sets of random numbers with accurate population statistics representing analytic stochastic quantities associated with probability/cumulative density functions. These multiple sets of random numbers will also ensure relationships of independence or correlation as desired. In one methodology of the invention, the method includes the steps of decomposing a set of discrete samples between an upper limit and a lower limit of a uniform distribution into a set of random coefficients, normalizing all random coefficients by the second non-central statistical moment of the population, developing normalized antithetic samples, mapping the normalized samples and normalized antithetic samples to produce accurate populations representing the distributions of the variates, and then ordering the population and antithetic population according to Walsh to enforce independence or correlation.

Moreover, embodiments of the invention also provide a method for determining scaling of coefficients for a known or hypothesized function with known stochastic quantities of mean and variance for inputs and outputs. This embodiment of the invention utilizes the simplest form of distribution, a two-point distribution, to develop population arrays for each variate, combination of multiplication of variates, and even higher order powers of variates. With this information, the output population is easily composed, and then manipulated to match the known output mean and variance. The coefficients are then determined through multiplication of the left inverse of the previously composed matrix.

Embodiments of the invention specifically provide a method for generating and analyzing random sample values. The method includes generating a random population array with a distribution, and generating an array of random number coefficients by decomposing the random population array distribution using mean and variance. The array of random number coefficients are normalized. Normalized samples and antithetic samples are mapped to the distribution of the random population array. Finally, the mapped, normalized samples and mapped normalized antithetic samples are arranged into a Walsh pattern.

In some embodiments the method further includes determining a scaling of a function with known stochastic quantities of mean and variance and utilizing a two-point distribution for each variate, selecting a set of two numbers. Each point of the two point distribution in these embodiments is located at one standard deviation away from a mean of the distribution. Further, in these embodiments, the method includes forming a plurality of population arrays, forming each population array of the plurality of population arrays for each variate and each combination of multiplication of variates, and forming a matrix from the plurality of population arrays. The matrix may be multiplied by a vector of coefficients forming a single population array representing an output variable for these embodiments.

In some embodiments the distribution of the random population array is a uniform distribution. In some of these embodiments, the distribution is a Gaussian distribution. Further, in some of these embodiments, the uniform distribution of the random population array is generated such that the uniform distribution of the random population array is between 0 and 1.

In some embodiments the generation of the random population array includes establishing a set of random numbers from Latin Hypercube Sampling. In some embodiments the generating an array of random number coefficients by decomposing the random population array distribution using mean and variance further includes producing data to be used to determine an accuracy of the random population array. For these embodiments, a sum of elements in an array of random number coefficients equals zero.

In some embodiments the mapping is a symmetric distribution. In some of these and other embodiments the arranging into a Walsh pattern enforces orthogonality.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1:
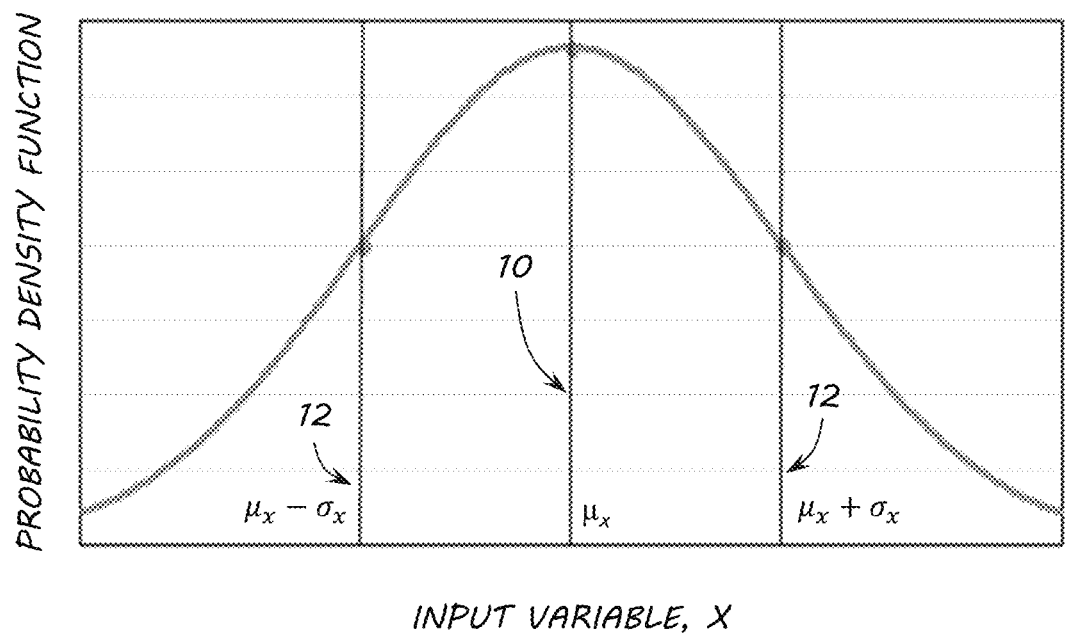
FIG. 1 is graph of a distributed variable representation.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Any process, including equations that describe physics-based performance can be modeled stochastically, where the inputs and outputs are characterized by a distribution. The first two statistical moments, mean and variance, provide essential information for quality control. However, developing this information can be time consuming and costly. For empirical processes and equations, experiments must be conducted on a large enough sample size to effectively characterize mean and variance behavior of a single performance function, and multiple types of experiments are required to characterize different types performance behaviors. For analytic processes and equations, computational characterization of mean and variance through Monte Carlo method of simulation may require hundreds of thousands (or even millions) of input samples, which are then used in the process or equation to produce an output distribution that can then be characterized stochastically. Alternatively, surrogate methods are used to characterize a complex process of many variables to minimize error in a statistical sense, but the final output stochastic parameters must still be determined for the purpose of quality control.

The methodology described in conjunction with the embodiments of the invention may be used to accurately characterize the observed output statistical parameters (mean and variance) of any addition/subtraction/multiplication relationship of linearly independent distributed input variables. This methodology can be used to decrease the number of samples necessary for Monte Carlo simulation, and provide a more accurate evaluation by eliminating errors in sample mean, variance, and covariance. This methodology can be used to solve the inverse problem of determining the statistical distributions of the independent input variables necessary to achieve the output result, either by scaling or selection. This methodology can be modified to allow for correlated distributions within certain limits. This methodology may additionally be modified for nonlinear inputs if the statistical characteristics of the nonlinear variables and the covariance are within that variable (i.e. cov(x, $x^2$)).

A set of N input variables may be given by:

$$X_1, X_2, X_3, \ldots X_N \tag{1}$$

Where each input variable, $X_i$, is considered a distributed variable, as shown in FIG. 1. The distributed variable may be represented as a function, or as an array of sample points. The function or array of sample points may then be used to determine the first two statistical moments, the mean, $\mu_{X_i}$, and the standard deviation, $\sigma_{x_i}$, where the sub-subscript "i" represents the index of the variable, i=1, ..., N. The location of the mean, 10, and first standard deviations, 12, for a symmetric (in this case, Gaussian) distribution are shown in FIG. 1. This methodology will work with any distribution that can be described by a mean and standard deviation. The variance is the square of the standard deviation, $\sigma_{x_i}^2$, and will be written symbolically as such. Alternatively, the standard deviation is simply the square root of the variance.

A function, $f$, which is a linear relationship of independent input variables has all possible combinations of linear terms, resulting in a total of $2^N$ terms where the first term is a constant. For example, three independent input variables results in a total of 8 ($2^3$=8) terms possible in the linear relationship. This example relationship is given by the scalar equation:

$$f = \alpha_1 + \alpha_2 x_1 + \alpha_3 x_2 + \alpha_4 x_1 x_2 + \alpha_5 x_3 + \alpha_6 x_1 x_3 + \alpha_7 x_2 x_3 + \alpha_8 x_1 x_2 x_3 \quad (2)$$

The mean of the function can be determined analytically by expanding all the terms of expectation of the function:

$$\mu_f = E[f] = E[\alpha_1 + \alpha_2 x_1 + \alpha_3 x_2 + \alpha_4 x_1 x_2 + \alpha_5 x_3 + \alpha_6 x_1 x_3 + \alpha_7 x_2 x_3 + \alpha_8 x_1 x_2 x_3] = \alpha_1 + \alpha_2 \mu_{x_1} + \alpha_3 \mu_{x_2} + \alpha_4 \mu_{x_1} \mu_{x_2} + \alpha_5 \mu_{x_3} + \alpha_6 \mu_{x_1} \mu_{x_3} + \alpha_7 \mu_{x_2} \mu_{x_3} + \alpha_8 \mu_{x_1} \mu_{x_2} \mu_{x_3} \quad (3)$$

Since the variables are represented by independent distributions, all of the covariance terms, $\text{cov}(x_i, x_j)$ are zero and thus not included in the formulation. The variance of the function can be determined by expanding all the terms of the square of the function and subtracting the square of the mean:

$$\sigma_f^2 = E[f^2] - (E[f])^2 = E \quad (4)$$

$$[(a_1 + a_2 x_1 + a_3 x_2 + a_4 x_1 x_2 + a_5 x_3 + a_6 x_1 x_3 + a_7 x_2 x_3 + a_8 x_1 x_2 x_3)^2]$$
$$- \mu_f^2 = a_2^2 \sigma_{x_1}^2 + a_3^2 \sigma_{x_2}^2 +$$
$$a_4^2 (\mu_{x_1}^2 \sigma_{x_2}^2 + \mu_{x_2}^2 \sigma_{x_1}^2 + \sigma_{x_1}^2 \sigma_{x_2}^2) +$$
$$a_5^2 \sigma_{x_3}^2 + a_6^2 (\mu_{x_1}^2 \sigma_{x_3}^2 + \mu_{x_3}^2 \sigma_{x_1}^2 + \sigma_{x_1}^2 \sigma_{x_3}^2) +$$
$$a_7^2 (\mu_{x_2}^2 \sigma_{x_3}^2 + \mu_{x_3}^2 \sigma_{x_2}^2 + \sigma_{x_2}^2 \sigma_{x_3}^2) +$$
$$a_8^2 (\mu_{x_1}^2 \mu_{x_2}^2 \sigma_{x_3}^2 + \mu_{x_2}^2 \mu_{x_3}^2 \sigma_{x_4}^2 + \mu_{x_3}^2 \mu_{x_1}^2 \sigma_{x_2}^2 + \mu_{x_1}^2 \sigma_{x_2}^2 \sigma_{x_3}^2 +$$
$$\mu_{x_2}^2 \sigma_{x_1}^2 \sigma_{x_3}^2 + \mu_{x_3}^2 \sigma_{x_2}^2 \sigma_{x_3}^2 + \sigma_{x_1}^2 \sigma_{x_2}^2 \sigma_{x_3}^2) + 2 a_2 a_4 \mu_{x_2} \sigma_{x_1}^2 +$$
$$2 a_2 a_6 \mu_{x_3} \sigma_{x_1}^2 + 2 a_2 a_8 \mu_{x_2} \mu_{x_3} \sigma_{x_1}^2 + 2 a_3 a_4 \mu_{x_1} \sigma_{x_2}^2 +$$
$$2 a_3 a_7 \mu_{x_3} \sigma_{x_2}^2 + 2 a_3 a_8 \mu_{x_1} \mu_{x_3} \sigma_{x_2}^2 + 2 a_4 a_6 \mu_{x_2} \mu_{x_3} \sigma_{x_1}^2 +$$
$$2 a_4 a_7 \mu_{x_1} \mu_{x_3} \sigma_{x_2}^2 + 2 a_4 a_8 \mu_{x_3} (\mu_{x_1}^2 \sigma_{x_2}^2 + \mu_{x_2}^2 \sigma_{x_1}^2 + \sigma_{x_1}^2 \sigma_{x_2}^2) +$$
$$2 a_5 a_6 \mu_{x_1} \sigma_{x_3}^2 + 2 a_5 a_7 \mu_{x_2} \sigma_{x_3}^2 + 2 a_5 a_8 \mu_{x_1} \mu_{x_2} \sigma_{x_3}^2 +$$
$$2 a_6 a_8 \mu_{x_2} (\mu_{x_1}^2 \sigma_{x_3}^2 + \mu_{x_3}^2 \sigma_{x_1}^2 + \sigma_{x_1}^2 \sigma_{x_3}^2) +$$
$$2 a_7 a_8 \mu_{x_1} (\mu_{x_2}^2 \sigma_{x_3}^2 + \mu_{x_3}^2 \sigma_{x_2}^2 + \sigma_{x_2}^2 \sigma_{x_3}^2)$$

As stated prior, since the variables are represented by independent distributions, all of the covariance terms, $\text{cov}(x_i, x_j)$ are zero and thus not included in the formulation. Although the mean formulation had only $2^N$ terms, the variance has $2^N!$ terms prior to cancellation/contraction. The analytic method to compute the full mean and variance of all terms within a linear relationship is prohibitive.

The use of Monte Carlo simulation relieves the need to expand or contract so many terms in the mathematical expectation formulation, but relies on arrays composed on the order of $1 \times 10^6$ random elements for each of the independent terms. The number of random samples is to effectively reduce the errors in the estimation of the mean and variance of a given input variable, and reduce the error in the estimation of the covariance between independent variables. The function must be evaluated a number of times equal to the number of samples (NSamples) in the random variable arrays. Then, the resulting function array will provide the distributed random points for the calculation of the mean and variance of the function:

$$\mu_f = \frac{1}{NSamples} \sum_{j=1}^{NSamples} f_j \quad (5)$$

$$\sigma_f^2 = \frac{1}{NSamples} \sum_{j=1}^{NSamples} (f_j - \mu_f)^2 = \frac{1}{NSamples} \left( \sum_{j=1}^{NSamples} f_j^2 \right) - \mu_f^2 \quad (6)$$

In both of the methodologies described above, a large number of expansions and contractions, or a large number of function evaluations, must be performed.

The following method describes the manner that the mean and variance of the function, $\mu_f$ and $\sigma_f$ respectively, can be computed efficiently and accurately from only the mean and standard deviation of each linear input variable, $\mu_{x_i}$ and $\sigma_{x_i}$. This method utilizes a minimum number of sample points that are chosen to effectively maintain orthogonality of the input distributions, through Walsh-Hadamard transformation.

Walsh-Hadamard transformation consists of the multiplication of a vector by the Walsh-Hadamard matrix. The Walsh-Hadamard matrix is composed for N independent variables by the recursive formula:

$$[W(2^N)] = \begin{bmatrix} W(2^{N-1}) & W(2^{N-1}) \\ W(2^{N-1}) & -W(2^{N-1}) \end{bmatrix} \quad (7)$$

The first order Walsh-Hadamard matrix is therefore:

$$[W(2^1)] = \begin{bmatrix} +1 & +1 \\ +1 & -1 \end{bmatrix} \quad (8)$$

The second order Walsh-Hadamard matrix is determined by substituting the first order matrix into the recursive formula:

$$[W(2^N)] = \begin{bmatrix} W(2^1) & W(2^1) \\ W(2^1) & -W(2^1) \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad (9)$$

For the example of three independent distributed variables, the $3^{rd}$ order Walsh-Hadamard matrix is given by:

$$[W] = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \quad (10)$$

Three vectors, $\{\tilde{X}_1\}$, $\{\tilde{X}_2\}$, and $\{\tilde{X}_3\}$ are formulated using only the mean and standard deviation for the respective variable. In each vector, the mean, $\mu_{X_i}$, occupies the first element of the column vector, and the standard deviation, $\sigma_{X_i}$, occupies the $2^{i-1}=1$ element of the column vector. Therefore, for the first vector, $\{\tilde{X}_1\}$ (i.e., i=1), the standard deviation resides in the $(2^{1-1}+1=2)$ $2^{nd}$ element, the second vector, $\{\tilde{X}_2\}$ (i.e., i=2), the standard deviation resides in the $(2^{2-1}+1=3)$ $3^{rd}$ element, and the third vector, $\{\tilde{X}_3\}$ (i.e., i=3), the standard deviation resides in the $(2^{3-1}+1=5)$ $5^{th}$ element. The three vectors are therefore written:

$$\{\tilde{X}_1\} = \begin{Bmatrix} \mu_{X_1} \\ \sigma_{X_1} \\ 0 \\ 0 \\ 0 \\ 0 \\ 0 \\ 0 \end{Bmatrix}, \{\tilde{X}_2\} = \begin{Bmatrix} \mu_{X_2} \\ 0 \\ \sigma_{X_2} \\ 0 \\ 0 \\ 0 \\ 0 \\ 0 \end{Bmatrix}, \{\tilde{X}_3\} = \begin{Bmatrix} \mu_{X_3} \\ 0 \\ 0 \\ 0 \\ \sigma_{X_3} \\ 0 \\ 0 \\ 0 \end{Bmatrix} \quad (11)$$

Each of these vectors is multiplied by the Walsh-Hadamard matrix, $[W]$, to produce a vector of $2^N$ ($2^3=8$ for this example) sample points:

$$\{X_1\} = [W]\{\tilde{X}_1\} = \begin{Bmatrix} \mu_{X_1} + \sigma_{X_1} \\ \mu_{X_1} - \sigma_{X_1} \\ \mu_{X_1} + \sigma_{X_1} \\ \mu_{X_1} - \sigma_{X_1} \\ \mu_{X_1} + \sigma_{X_1} \\ \mu_{X_1} - \sigma_{X_1} \\ \mu_{X_1} + \sigma_{X_1} \\ \mu_{X_1} - \sigma_{X_1} \end{Bmatrix}, \quad (12)$$

$$\{X_2\} = [W]\{\tilde{X}_2\} = \begin{Bmatrix} \mu_{X_2} + \sigma_{X_2} \\ \mu_{X_2} + \sigma_{X_2} \\ \mu_{X_2} - \sigma_{X_2} \\ \mu_{X_2} - \sigma_{X_2} \\ \mu_{X_2} + \sigma_{X_2} \\ \mu_{X_2} + \sigma_{X_2} \\ \mu_{X_2} - \sigma_{X_2} \\ \mu_{X_2} - \sigma_{X_2} \end{Bmatrix}, \quad (13)$$

$$\{X_3\} = [W]\{\tilde{X}_3\} = \begin{Bmatrix} \mu_{X_3} + \sigma_{X_3} \\ \mu_{X_3} + \sigma_{X_3} \\ \mu_{X_3} + \sigma_{X_3} \\ \mu_{X_3} + \sigma_{X_3} \\ \mu_{X_3} - \sigma_{X_3} \\ \mu_{X_3} - \sigma_{X_3} \\ \mu_{X_3} - \sigma_{X_3} \\ \mu_{X_3} - \sigma_{X_3} \end{Bmatrix} \quad (14)$$

Computing the statistical mean and variance of each array matches the inputs exactly:

$$\mu_{X_1} = \frac{1}{8}\sum_{j=1}^{8} X_{1j} = \mu_{X_1}, \; \sigma_{X_1}^2 = \frac{1}{8}\sum_{j=1}^{8}(X_{1j} - \mu_{X_1})^2 = \sigma_{X_1}^2 \quad (15)$$

$$\mu_{X_2} = \frac{1}{8}\sum_{j=1}^{8} X_{2j} = \mu_{X_2}, \; \sigma_{X_2}^2 = \frac{1}{8}\sum_{j=1}^{8}(X_{2j} - \mu_{X_2})^2 = \sigma_{X_2}^2 \quad (16)$$

$$\mu_{X_3} = \frac{1}{8}\sum_{j=1}^{8} X_{3j} = \mu_{X_3}, \; \sigma_{X_3}^2 = \frac{1}{8}\sum_{j=1}^{8}(X_{3j} - \mu_{X_3})^2 = \sigma_{X_3}^2 \quad (17)$$

Computing the statistical mean and variance of the multiplication of any two variable arrays produces the same results as the product distribution, given the covariance of each combination of vectors ($\text{cov}(X_1, X_2)$, $\text{cov}(X_2, X_3)$, and $\text{cov}(X_1, X_3)$) is zero.

$$\mu_{X_1 X_2} = \frac{1}{8}\sum_{j=1}^{8} X_{1j} X_{2j} = \mu_{X_1}\mu_{X_2}, \quad (18)$$

$$\sigma_{X_1 X_2}^2 = \frac{1}{8}\sum_{j=1}^{8}(X_{1j}X_{2j} - \mu_{X_1 X_2})^2 = \mu_{X_2}^2 \sigma_{X_1}^2 + \mu_{X_1}^2 \sigma_{X_2}^2 + \sigma_{X_1}^2 \sigma_{X_2}^2$$

$$\mu_{X_2 X_3} = \frac{1}{8}\sum_{j=1}^{8} X_{2j} X_{3j} = \mu_{X_2}\mu_{X_3}, \quad (19)$$

$$\sigma_{X_2 X_3}^2 = \frac{1}{8}\sum_{j=1}^{8}(X_{2j}X_{3j} - \mu_{X_2 X_3})^2 = \mu_{X_3}^2 \sigma_{X_2}^2 + \mu_{X_2}^2 \sigma_{X_3}^2 + \sigma_{X_2}^2 \sigma_{X_3}^2$$

$$\mu_{X_1 X_3} = \frac{1}{8}\sum_{j=1}^{8} X_{1j} X_{3j} = \mu_{X_1}\mu_{X_3}, \quad (20)$$

$$\sigma_{X_1 X_3}^2 = \frac{1}{8}\sum_{j=1}^{8}(X_{1j}X_{3j} - \mu_{X_1 X_3})^2 = \mu_{X_3}^2 \sigma_{X_1}^2 + \mu_{X_1}^2 \sigma_{X_3}^2 + \sigma_{X_1}^2 \sigma_{X_3}^2$$

Computing the statistical mean and variance of the multiplication of three variable arrays produces the correct triple product (given $\text{cov}(X_1, X_2 X_3)$, $\text{cov}(X_2, X_1 X_3)$, and $\text{cov}(X_3, X_1 X_2)$ are zero):

$$\mu_{X_1 X_2 X_3} = \frac{1}{8} \sum_{j=1}^{8} X_{1j} X_{2j} X_{3j} = \mu_{X_1} \mu_{X_2} \mu_{X_3} \quad (21)$$

$$\sigma^2_{X_1 X_2 X_3} = \frac{1}{8} \sum_{j=1}^{8} (X_{1j} X_{2j} X_{3j} - \mu_{X_1 X_2 X_3})^2 = \quad (22)$$
$$\mu^2_{X_2} \mu^2_{X_3} \sigma^2_{X_1} + \mu^2_{X_1} \mu^2_{X_3} \sigma^2_{X_2} + \mu^2_{X_1} \mu^2_{X_2} \sigma^2_{X_3} +$$
$$\mu^2_{X_3} \sigma^2_{X_1} \sigma^2_{X_2} + \mu^2_{X_1} \sigma^2_{X_2} \sigma^2_{X_3} + \mu^2_{X_2} \sigma^2_{X_1} \sigma^2_{X_3} + \sigma^2_{X_1} \sigma^2_{X_2} \sigma^2_{X_3}$$

Incorporating all the linear combinations of the Walsh-Hadamard transformed vectors into a single function will result in an array for which the correct statistical mean and variance may be computed.

The arrays for the Walsh-Hadamard transformed distributed input variables comprise the output function, $\{F\}$:

$$\{F\} = a_1\{1\} + a_2\{X_1\} + a_3\{X_2\} + \quad (23)$$
$$a_4 \begin{bmatrix} \ddots & & \\ & X_{1i} & \\ & & \ddots \end{bmatrix} \{X_2\} + a_5\{X_3\} + a_6 \begin{bmatrix} \ddots & & \\ & X_{1i} & \\ & & \ddots \end{bmatrix} \{X_3\} +$$
$$a_7 \begin{bmatrix} \ddots & & \\ & X_{2i} & \\ & & \ddots \end{bmatrix} \{X_3\} + a_8 \begin{bmatrix} \ddots & & \\ & X_{1i} & \\ & & \ddots \end{bmatrix} \begin{bmatrix} \ddots & & \\ & X_{2i} & \\ & & \ddots \end{bmatrix} \{X_3\}$$

Alternatively, each individual element of the output function vector can be determined by inputting the corresponding elements of the input vectors, just as a Monte Carlo simulation, but with only $2^N$ ($2^3=8$ for this example) samples:

$$\{F_i\} = a_1 + a_2\{X_{1i}\} + a_3\{X_{2i}\} + a_4\{X_{1i}\}\{X_{2i}\} + a_5\{X_{3i}\} + a_6\{X_{1i}\}\{X_{3i}\} + a_7\{X_{2i}\}\{X_{3i}\} + a_8\{X_{1i}\}\{X_{2i}\}\{X_{3i}\} \quad (24)$$

The statistical mean and variance of the function array resulting from Walsh-Hadamard transformation is calculated in the standard fashion of Monte Carlo simulation, and exact matches the analytic result:

$$\mu_f = \frac{1}{8} \sum_{j=1}^{8} F_j = a_1 + a_2 \mu_{x_1} + a_3 \mu_{x_2} + a_4 \mu_{x_1} \mu_{x_2} + \quad (25)$$
$$a_5 \mu_{x_3} + a_6 \mu_{x_1} \mu_{x_3} + a_7 \mu_{x_2} \mu_{x_3} + a_8 \mu_{x_1} \mu_{x_2} \mu_{x_3}$$

$$\sigma^2_f = \frac{1}{NSamples} \sum_{j=1}^{NSamples} (f_j - \mu_j)^2 = \frac{1}{NSamples} \left( \sum_{j=1}^{NSamples} f_j^2 \right) - \mu_f^2 \quad (26)$$

The Walsh-Hadamard transformation of the output vector is written:

$$\{F\} = [W(2^N)]\{\tilde{F}\} \quad (27)$$

where the length of the vector F must be length $2^N$.

The example relationship is therefore a set of $2^N$ linearly independent equations, with the function, $\{F_{WH}\}$, and each input variable, $\{X_i\}$, as vectors of length $2^N$. For the same example of 3 independent input variables, this results in a total of 8 ($2^3$) equations for the linear relationship. The $i^{th}$ equation is represented by Eq. (24) above. Because the coefficients can be positive or negative, the relationship illustrates any combination of addition, subtraction, or multiplication. The resulting mean and variance of the function is exact, and is calculated much more efficiently than either expanding the equations for the first and second statistical moments, or performing a Monte Carlo simulation. Further, since the relationship between the resulting Function array and the individual input variables is unique, the process can be reversed to determine the scaling of each distributed input variable. The inverse of the Walsh matrix is simply the Walsh matrix divided by the scalar $2^N$. The third order inverse Walsh-Hadamard Matrix is given:

$$[W]^{-1} = \frac{1}{2^3} \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \quad (28)$$

The inverse Walsh function multiplied by the output function vector produces a set of sample points that map uniquely to the coefficients for a given set of input variable distribution parameters:

$$[W]^{-1} * \{F\} = \begin{bmatrix} 1 & \mu_{x_1} & \mu_{x_2} & \mu_{x_1}\mu_{x_2} & \mu_{x_3} & \mu_{x_1}\mu_{x_3} & \mu_{x_2}\mu_{x_3} & \mu_{x_1}\mu_{x_2}\mu_{x_3} \\ & \sigma_{x_1} & & \mu_{x_2}\sigma_{x_1} & & \mu_{x_3}\sigma_{x_1} & & \mu_{x_2}\mu_{x_3}\sigma_{x_1} \\ & & \sigma_{x_2} & \mu_{x_1}\sigma_{x_2} & & & \mu_{x_3}\sigma_{x_2} & \mu_{x_1}\mu_{x_3}\sigma_{x_2} \\ & & & \sigma_{x_1}\sigma_{x_2} & & & & \mu_{x_3}\sigma_{x_1}\sigma_{x_2} \\ & & & & \sigma_{x_3} & \mu_{x_1}\sigma_{x_3} & \mu_{x_2}\sigma_{x_3} & \mu_{x_1}\mu_{x_2}\sigma_{x_3} \\ & & & & & \sigma_{x_1}\sigma_{x_3} & & \mu_{x_2}\sigma_{x_1}\sigma_{x_3} \\ & & & & & & \sigma_{x_2}\sigma_{x_3} & \mu_{x_1}\sigma_{x_2}\sigma_{x_3} \\ & & & & & & & \sigma_{x_1}\sigma_{x_2}\sigma_{x_3} \end{bmatrix} \begin{Bmatrix} a_1 \\ a_2 \\ a_3 \\ a_4 \\ a_5 \\ a_6 \\ a_7 \\ a_8 \end{Bmatrix} \quad (29)$$

The vector of coefficients, $\{\alpha_i\}$, results in a unique output function array, for known mean and standard deviation of each independent distributed variable. Therefore, the error between an observed output and a function array composed of input means and variances can be calculated and minimized by scaling the coefficients. Alternatively, for a given set of input means and variances with prescribed coefficients, the composition of the original relationship can be determined in a stochastic sense, in terms of the necessary coefficients that will result in the minimum error between the model and the observed output function.

Using this methodology, the number of samples in each array is $2^N$. This means that for 10 independent distributed variables, $2^{10}=1024$ elements are formulated for each array. Compared to a Monte Carlo simulation, this would still provide an improvement in the number of function evaluations. However, for 20 independent distributed variables, $2^{20}=1,048,576$, the number of function evaluations is equivalent to Monte Carlo simulation, with the only benefit being the guaranteed accuracy of the methodology.

The methodology can be nested, such as where individual distributed variables are composed of multiple independent distributed variables. In the problem with three variables above, if the three independent variables were each composed in some manner by three different independent distributed variables, the overall problem would require solving $3 \times 2^3 = 24$ evaluations, then combining those results into one set of $2^3 = 8$ evaluations for a total of 32 evaluations, rather than $2^9 = 512$ evaluations necessary for the problem to be done simultaneously. Therefore, as long as the problem is scalable in such a way that it can be broken down into sub-problems, very few evaluations will be necessary to determine the mean and variance of the final output, and the "curse of dimensionality" exhibited for large number of variables in $2^N$ evaluations can be avoided. In some embodiments, the methodology may utilize Fast Walsh-Hadamard Transformation and Inverse Fast Walsh-Hadamard Transformation to reduce the number of computations.

Due to the fact that the first two statistical moments, mean and standard deviation, are defined, any kind of distributed independent input variables can be combined through addition, subtraction, and multiplication using this method and retrieve an accurate result. If the mean and standard deviation of individual inputs have errors, these errors will propagate in a predictable manner such that the error of the final output can be estimated as well.

Embodiments employing the methodology may also be utilized to modify the Monte Carlo method, accounting for a larger sample size that more accurately captures the mean and variance of a ratio (e.g., $u=p/k$) while minimizing the individual errors of mean and variance of each independent distributed input, and constraining the covariance between independent distributed inputs to be zero.

In other embodiments, the methodology can be modified to allow for correlated variables ($\text{cov}(X_i, X_j) \neq 0$). For this methodology, a matrix of correlations is defined:

$$[\rho_{Corr}] = \begin{bmatrix} 1 & \rho_{X_1,X_2} & \cdots & \rho_{X_1,X_i} & \rho_{X_1,X_j} & \cdots & \rho_{X_1,X_{N-1}} & \rho_{X_1,X_N} \\ \rho_{X_1,X_2} & 1 & \cdots & \rho_{X_2,X_i} & \rho_{X_2,X_j} & \cdots & \rho_{X_2,X_{N-1}} & \rho_{X_2,X_N} \\ \vdots & \vdots & \ddots & \vdots & & & \vdots & \vdots \\ & & & 1 & \rho_{X_i,X_j} & & & \\ \rho_{X_1,X_i} & \rho_{X_2,X_i} & \cdots & \rho_{X_i,X_j} & 1 & & \rho_{X_i,X_{N-1}} & \rho_{X_i,X_N} \\ \vdots & \vdots & & & \vdots & \ddots & \vdots & \\ \rho_{X_1,X_{N-1}} & \rho_{X_2,X_{N-1}} & \cdots & \rho_{X_i,X_{N-1}} & \rho_{X_j,X_{N-1}} & \cdots & 1 & \rho_{X_{N-1},X_N} \\ \rho_{X_1,X_N} & \rho_{X_2,X_N} & \cdots & \rho_{X_i,X_N} & \rho_{X_j,X_N} & \cdots & \rho_{X_{N-1},X_N} & 1 \end{bmatrix} \quad (30)$$

where $$\text{cov}(X_i, X_j) = \sigma_{X_i} \sigma_{X_j} \rho_{X_i,X_j} \quad (31)$$

and $$\rho_{X_i,X_i} = 1 \quad (32)$$

For the example of three correlated distributed input variables, the correlation matrix is:

$$[\rho_{Corr}] = \begin{bmatrix} 1 & \rho_{X_1,X_2} & \rho_{X_1,X_3} \\ \rho_{X_1,X_2} & 1 & \rho_{X_2,X_3} \\ \rho_{X_1,X_3} & \rho_{X_2,X_3} & 1 \end{bmatrix} \quad (33)$$

Additional embodiments utilizing the methodology may also be modified to allow addition, subtraction, and multiplication of non-linear variables (i.e., x, $x^2$, $x^3$, etc.). This requires user inputs for means and variances of higher order variables, and their covariance (i.e., $\text{cov}(x, x^2)$, $\text{cov}(x, x^3)$).

The methodology may additionally be modified to approximate the mean and variance of trigonometric and logarithmic output function (i.e. $\sin(x)$, $e^x$) if that output function can be approximated as an expansion of non-linear variables (i.e. $e^x \cong 1+x+\frac{1}{2}x^2+\frac{1}{6}x^3$). This methodology will retain errors due to the approximation.

In some embodiments of the invention, an expectation operator, $E[\bullet]$, can be used for stochastic quantification of a distributed variable or a function of distributed variables. Analytically, this becomes laborious and cumbersome. As set out above, Monte Carlo (MC) methods are more efficient for stochastic quantification by developing arrays of pseudo-random or quasi-random populations, or populations through Latin Hypercube Design, and performing a large number of simulations, with accuracy of MC methods being dependent on population size.

Consider the distributed variables, x and y, and a population representing that distributed variable, $\hat{x}$ and $\hat{y}$. For a variable, the difference error between analytic stochastic quantities of mean and variance, $\mu_x$ and $\sigma_x^2$ respectively, and the stochastic quantities of the populations, $m_x$ and $s_x^2$, can be written:

$$\delta_{m_{\hat{x}}} = m_{\hat{x}} - \mu_x \quad (34)$$
$$\delta_{s_{\hat{x}}^2} = s_{\hat{x}}^2 - \sigma_x^2$$

The difference error in the analytic covariance, $\text{cov}(x, y)$, and the covariance of the population array, $\text{cov}(\hat{x}, \hat{y})$, can be written:

$$\delta_{\text{cov}(\hat{x},\hat{y})} = \text{cov}(\hat{x},\hat{y}) - \text{cov}(x,y) \quad (35)$$

The correlation between independent distributed variables is defined as zero, thus simplifies to:

$$\delta_{\text{cov}(\hat{x},\hat{y})} = \text{cov}(\hat{x},\hat{y}) \quad (36)$$

For simple addition/subtraction, the difference error becomes:

$$\delta_{m_{\hat{x}\pm\hat{y}}} = \delta_{m_{\hat{x}}} \pm \delta_{m_{\hat{y}}} \quad (37)$$
$$\delta_{s_{\hat{x}\pm\hat{y}}^2} = \delta_{s_{\hat{x}}^2} + \delta_{s_{\hat{y}}^2} \pm 2\delta_{\text{cov}(\hat{x},\hat{y})}$$

From equation (37), it should be apparent that if the difference errors between analytic and population stochastic quantities of mean, variance, and covariance for the individual variables can be reduced to zero, the difference error in the addition/subtraction for mean and variance shall also be zero.

For multiplication, the difference error becomes:

$$\delta_{m_{\hat{x}\hat{y}}} = \delta_{m_{\hat{x}}} m_{\hat{y}} + \delta_{m_{\hat{y}}} m_{\hat{x}} + \delta_{m_{\hat{x}}}\delta_{m_{\hat{y}}} + \delta_{\text{cov}(\hat{x},\hat{y})} \quad (38)$$

$$\delta_{s_{\hat{x}\hat{y}}^2} = \mu_y^2 \delta_{s_{\hat{x}}^2} + \mu_x^2 \delta_{s_{\hat{y}}^2} + \delta_{s_{\hat{x}}^2}\delta_{s_{\hat{y}}^2} + (\sigma_x^2 \delta_{s_{\hat{y}}^2} + \sigma_y^2 \delta_{s_{\hat{x}}^2}) +$$
$$(2\mu_y \delta_{m_{\hat{y}}} + \delta_{m_{\hat{y}}}^2)(\sigma_x^2 + \delta_{s_{\hat{x}}^2}) + (2\mu_x \delta_{m_{\hat{x}}} + \delta_{m_{\hat{x}}}^2)(\sigma_y^2 + \delta_{s_{\hat{y}}^2}) +$$
$$\delta_{\text{cov}(\hat{x}^2,\hat{y}^2)} - 2\delta_{\text{cov}(\hat{x},\hat{y})}\text{cov}(x,y) - \delta_{\text{cov}(\hat{x},\hat{y})}^2 - 2\mu_x\mu_y\delta_{\text{cov}(\hat{x},\hat{y})} -$$
$$2(\mu_x \delta_{m_{\hat{y}}} + \delta_{m_{\hat{x}}}\mu_y + \delta_{m_{\hat{x}}}\delta_{m_{\hat{y}}})(\text{cov}(x,y) + \delta_{\text{cov}(\hat{x},\hat{y})})$$

From equation (38), it should be apparent that if the difference errors between analytic and population stochastic quantities of mean, variance, and covariance for the individual variables can be reduced to zero, the difference error in the multiplication mean shall also be zero, and the difference error in the multiplication variance shall be:

$$\delta_{s_{\hat{x}\hat{y}}^2} = \delta_{\text{cov}(\hat{x}^2,\hat{y}^2)} = \text{cov}(\hat{x}^2, \hat{y}^2) - \text{cov}(x^2, y^2) \quad (39)$$

Figure 2:
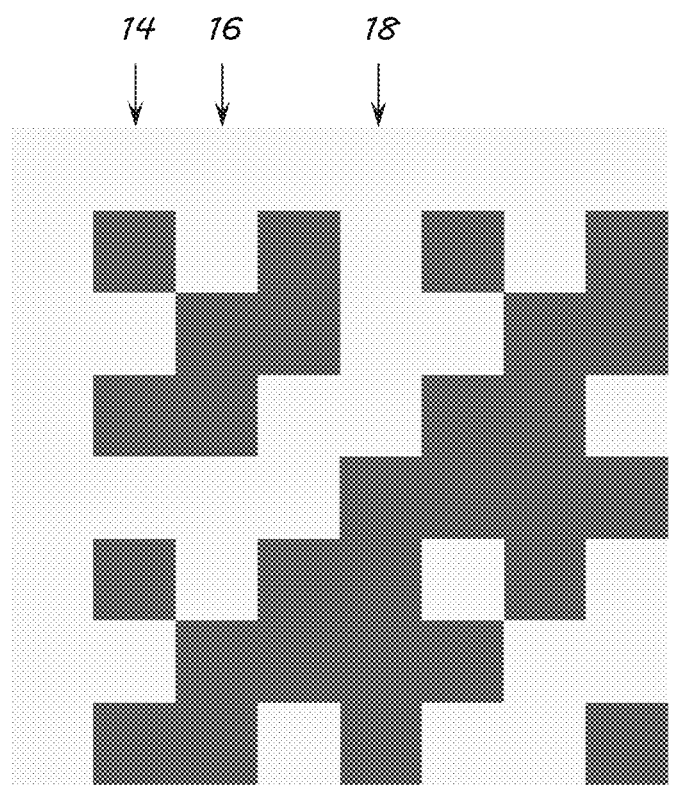
FIG. 2 is a graphical representation of a Walsh Matrix for N=3 Independent Variables.

The process utilizes three basic steps to manipulate a limited number of random variables: mirror, stretch/shrink, and then repeat in a pattern from the Walsh Function, as depicted by FIG. 2, where each light grey box is equivalent to a +1 multiplier, and each dark grey box is equivalent to a −1 multiplier. The key is that the $j^{th}$ independent distributed variable shall correspond to the $(2^{j-1}+1)$ column of the Matrix, so the first variable, corresponds to the $2^{nd}$, 14, column, the second variable corresponds to the $3^{rd}$, 16, column, the third variable corresponds to the $5^{th}$, 18, column, and so forth.

A few examples utilizing three independent distributed variables have been run to illustrate how the process can increase the accuracy of the stochastic prediction, or for a desired accuracy require much fewer calculations. The total number of random variables required in the process is $2^{-N}$ of an equivalent number of calculations utilizing pseudo-random, quasi-random, or Latin Hypercube Sampling (LHS). So in this example, the number of random variables required to be generated is ⅛ of the number generated to fill the population for MC utilizing traditional methods.

Figure 3:
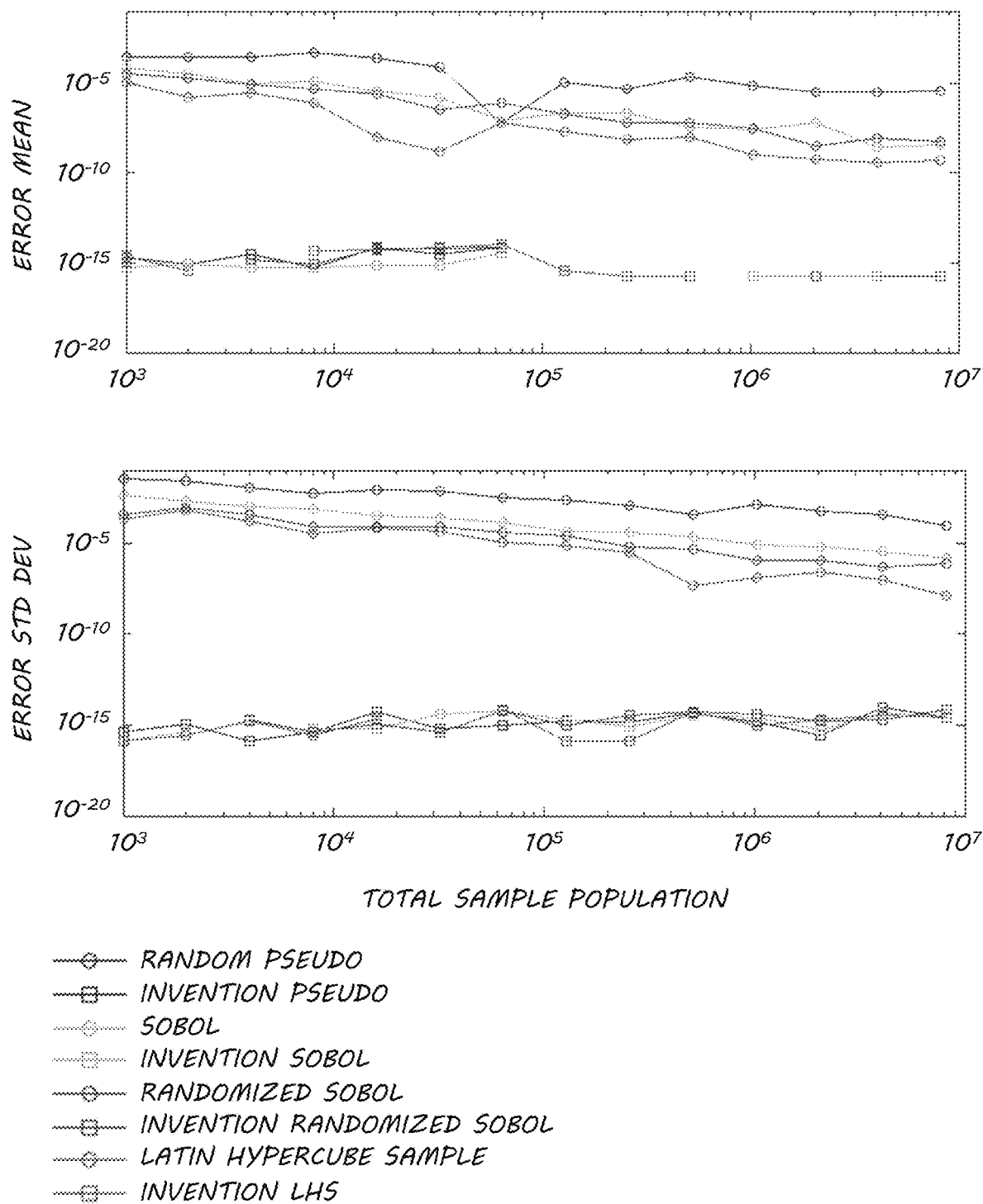
FIG. 3 contains plots of error in mean and standard deviation for a distributed variable.

In FIG. 3, the results of the error in mean and standard deviation for a Gaussian distributed variable, $x_3$, is shown for traditional pseudo-random, Sobol quasi-random, a randomized Sobol quasi-random, and LHS, and the methodology of embodiment of the invention applied to these same four methods. As is easy to see, embodiments of the invention bring the error in mean and standard deviation on the order of $10^{-15}$. Where there are "gaps", the error is actually below the minimum shown. In the case of the error in the standard deviation, there appears to be a subtle "growth", which is attributed to how the total absolute error was calculated as the total sample population was increased.

Figure 4:
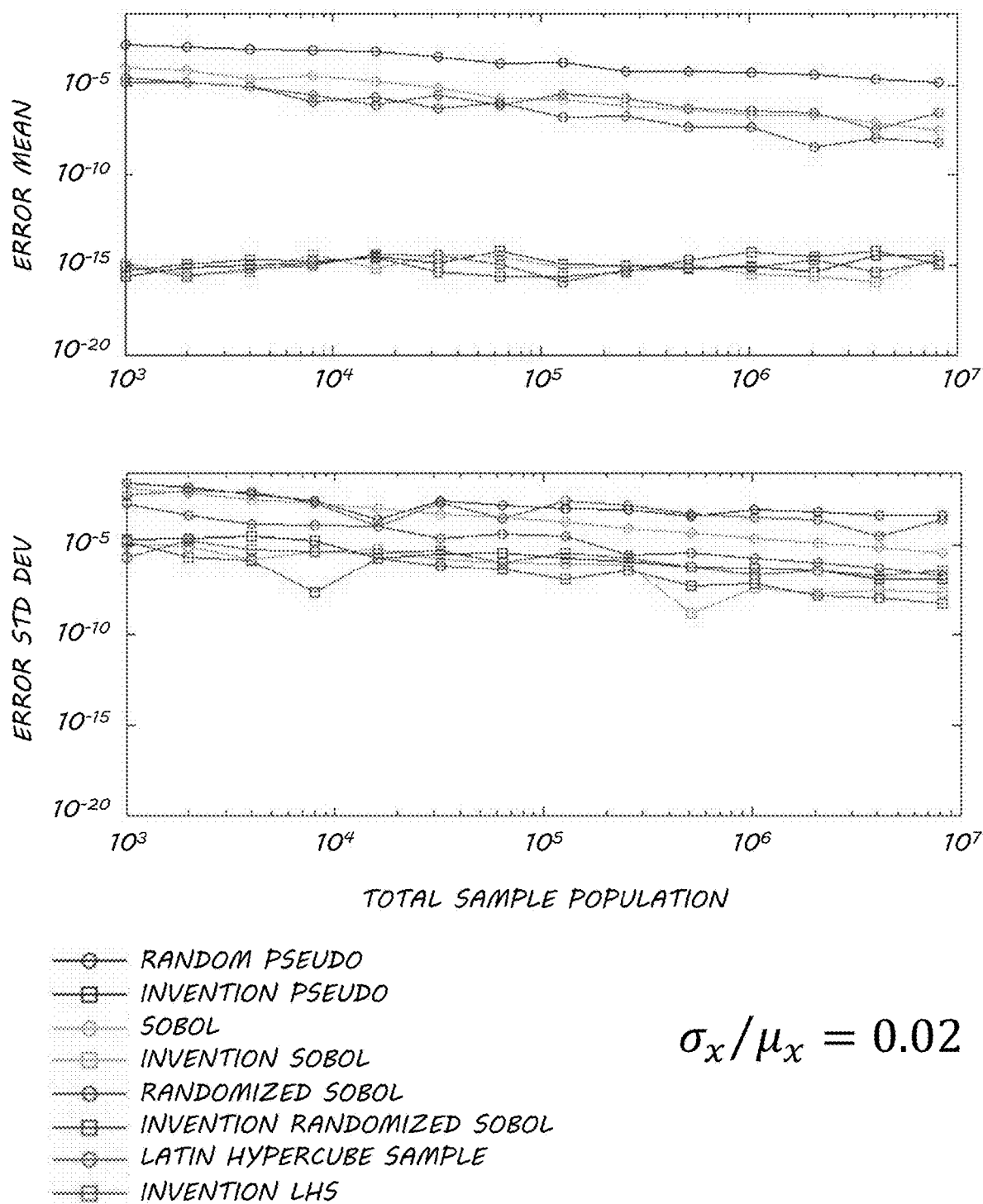
FIG. 4 contains plots of error in mean and standard deviation for a distributed volume of a cube, for coefficient variation of $\sigma_x/\mu_x=0.02$.
Figure 5:
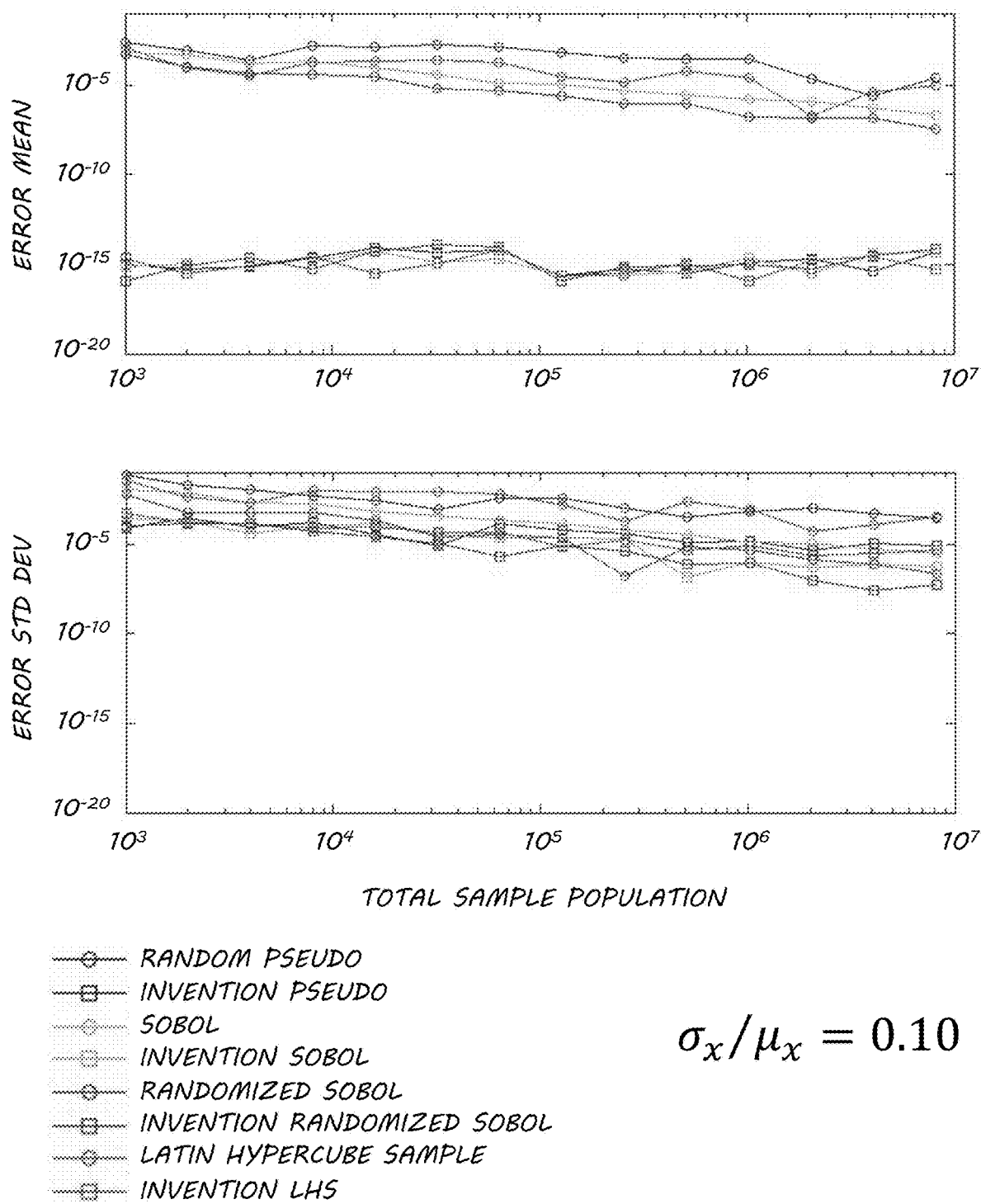
FIG. 5 contains plots of error in mean and standard deviation for a distributed volume of a cube, for coefficient variation of $\sigma_x/\mu_x=0.10$.

In FIGS. 4 and 5, the results of the error in the mean and standard deviation for a distributed volume of a cube calculated by multiplying three Gaussian distributed variables are shown for two different coefficients of variation. It is apparent that the smaller the ratio between standard deviation and mean the more significant the effect of error reduction. In the case of the larger coefficient of variation, there is a single simulation at 240,000 samples where the Randomized Sobol without application of the invention produces the least error in standard deviation, but that appears to be an artifact of the randomization procedure rather than a trend.

Figure 6:
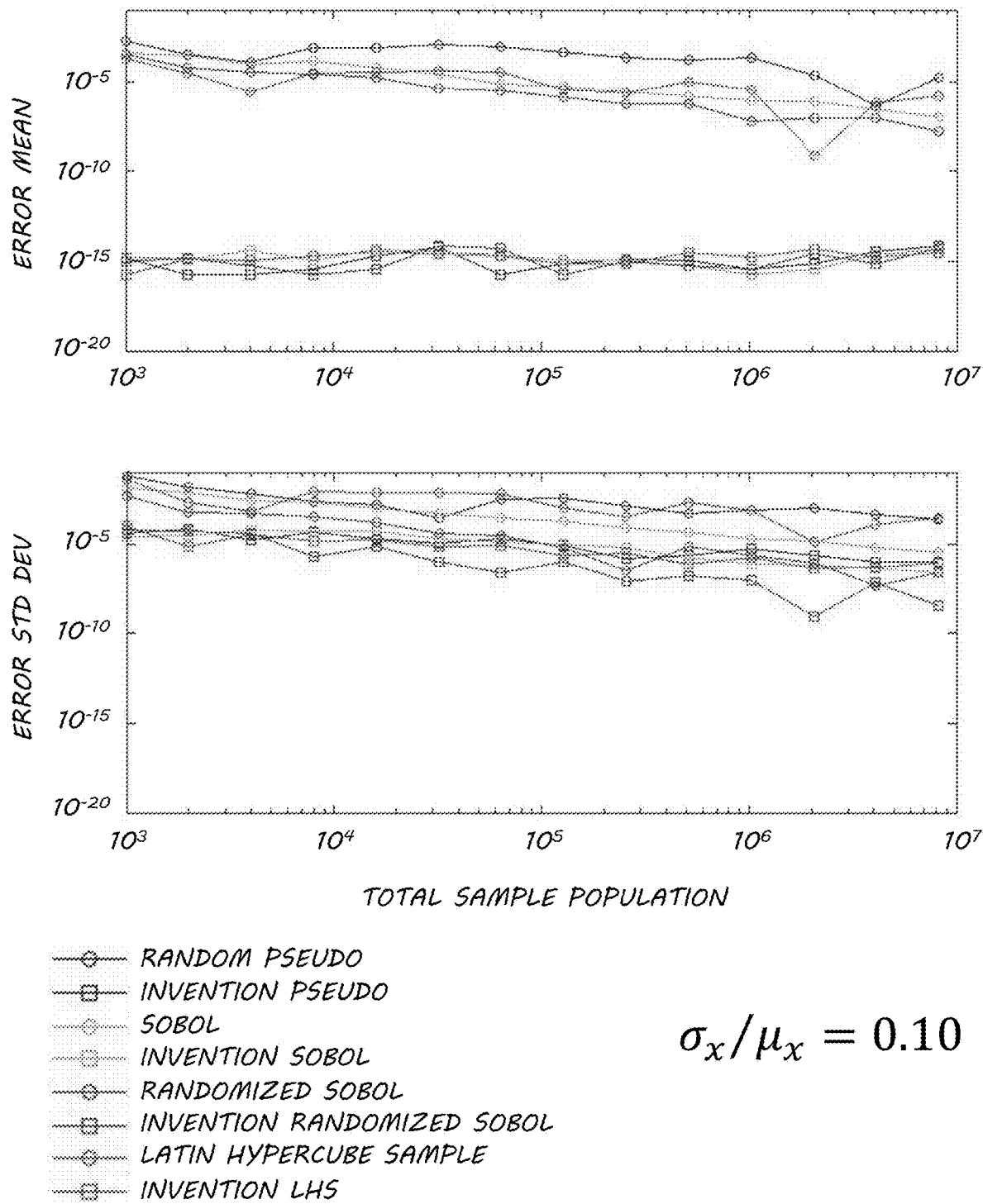
FIG. 6 contains plots of error in mean and standard deviation for a function, for Coefficient of Variation of $\sigma_x/\mu_x=0.10$.

In FIG. 6, the results of the error in the mean and standard deviation for the function of the three Gaussian distributed variables in equation (40) are shown for a single coefficient of variation.

$$F = x_1^2 + x_2^2 + x_3^2 + x_1 x_2 + x_2 x_3 + x_1 x_3 \quad (40)$$

As seen previously, errors are smaller in the case of the application of the invention methodology, although Randomized Sobol without the invention does perform rather well overall.

As discussed above, one limitation with the embodiments of the invention is related to the number of design variables that can be handled simultaneously, as it creates a population array of length $n \cdot 2^N$, where n is the number of random samples and N is the number of independent stochastic variables. Therefore, for a function of N=3 variables, with a population of n=1000 random samples, the MC simulation would require $1000 \cdot 2^3 = 8,000$ simulations to produce the output array. The stochastic quantification of the output array would then produce results with errors several magnitudes smaller than compared to pseudo-random, quasi-random, and Latin Hypercube design populations of equivalent size. If the desire is to determine stochastic quantification of the output array within a specified accuracy level, the methodology in the embodiments of the invention may be employed to achieve that level of error with significantly fewer (2 to 4 orders of magnitude) calculations.

Errors may be further reduced, in some embodiments, by using optimization to better select the limited number of samples to better simulate the higher order central moments and enforce zero correlation between all orders of variables. This would also assist in reducing the number of "random" samples necessary.

Figure 7:
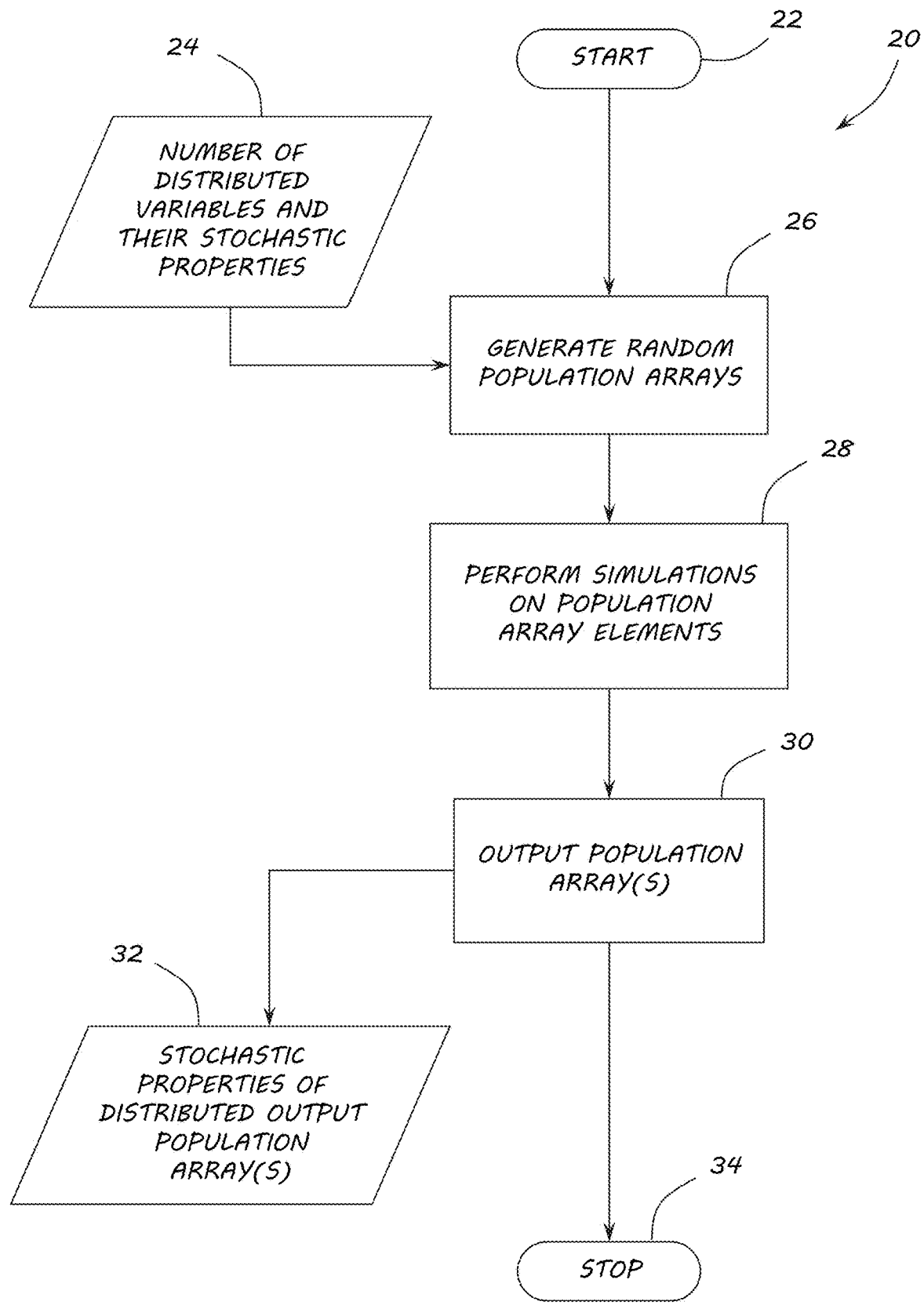
FIG. 7 contains a flowchart of a contemporary Monte Carlo method.

As set forth above, embodiments of the invention may be utilized to produce a population array, composed of random numbers, to represent any distribution for the purpose of evaluating a function or simulation, such as through Monte Carlo method as shown in the flow chart 20 in FIG. 7, which shall efficiently produce accurate mean and variance stochastic quantities of interest. The process begins at block 22. The inputs are defined as a number of distributed variables and the stochastic properties of the distributed variables in block 24. The number of variables will be problem dependent. And, each of the distributed variables may be described by a distribution shape, such as Normal/Gaussian, Weibull, Lognormal, Uniform, etc., and stochastic quantities of mean and variance associated with the distributed variable. Random population arrays are generated for each distributed variable in block 26. The number of elements to populate these arrays may be input by a user. Simulations may be performed on the population array elements in block 28. This step may be performed by any number of methods, such as with a "do look," where the elements in each corresponding array are input into the function or simulation and the output is determined for that set of elements. Population arrays are output in block 30. The results of each function evaluation or simulation may be stored in output population arrays. These arrays are generally the same length as the input population arrays. Finally, stochastic properties of the distributed output population arrays may be determined in block 32. Stochastic analysis of the output population array may be performed to quantify mean and variance. A histogram of the output population array may be one of many tools used to help determine a distribution share. And, from the results of the histogram, a cumulative density function may be assembled. The process is concluded at block 34.

The embodiments of the invention approve upon the art in FIG. 7 by addressing the generation of multiple population arrays (block 26 of flowchart 20) with prescribed independence or correlation. As illustrated above, the embodiments of the invention assist in producing multiple population arrays with prescribed independence or correlation. The methodology described with the embodiments of the invention may be used in a lab environment with general purpose computers with coupled displays or may alternatively be implemented in commercial products with special-purpose processors. Moreover, the embodiments of the invention may be utilized for a variety of applications for which knowledge of robustness is or can be used.

Figure 8:
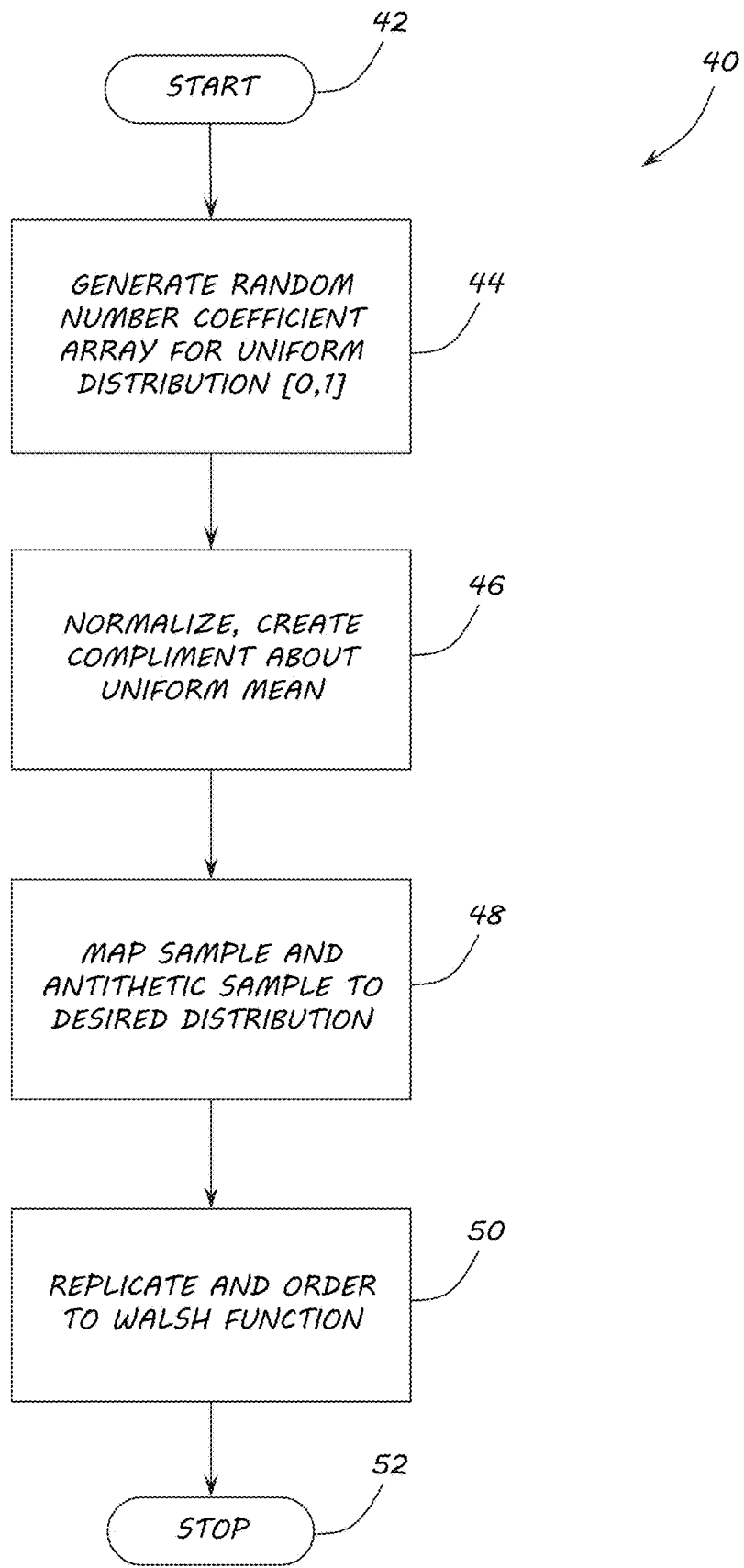
FIG. 8 contains a flowchart detailing the generation step of the flowchart of FIG. 7 consistent with embodiments of the invention.

Turning to the flowchart 40 in FIG. 8, this process replaces the contemporary process for block 26 of flowchart 20 in FIG. 7 and may be performed for each of the population arrays. The process begins at block 42. The first component is an initial sample generation component in block 44, which generates a random population array for a uniform distribution. In accordance with the number generation component, a set of numbers $\{\rho\}$ is generated. The set of random numbers, in some embodiments, may be generated such that they have a uniform distribution between 0 and 1. The set of random numbers is decomposed into an array of random number coefficients $\{r\}$ by use of known analytic mean and variance for a uniform distribution between 0 and 1. The set of random numbers can be established through known methods that produce pseudo-random arrays, or quasi-random arrays, or methods such as Latin Hypercube Sampling.

The first component in block 44, may, in some embodiments, generate the array of random number coefficients by decomposing the uniform distribution population array with known analytic mean and variance, to produce data that is used to determine the accuracy of the population representing the uniform distribution. The sum of the elements in the array of random number coefficients, $\Sigma r_i$, should equal zero for the population mean to accurately represent the input mean. The sum of the square of the elements in the array of random number coefficients, $\Sigma r_i^2$, should equal one for the population variance to accurately represent the input variance. In both cases, these can be considered biased mean and variance due to utilizing all of the elements of the population.

In the second component in block 46, the array of random number coefficients is normalized by multiplication by the inverse of the square root of the second non-central moment of the array. This enforces the condition that the sum of the square of the elements of the array of random number coefficients is equal to one. Each of the normalized samples, $\bar{r}_i$, in the normalized array of random number coefficients, $\{\bar{r}\}$, is mirrored about zero to produce a normalized antithetic sample, $-\bar{r}_i$, which is contained in the normalized antithetic array, $\{-\bar{r}\}$. This enforces the condition that the elements of the total array, composed of normalized samples and normalized antithetic samples, sum to zero. The variance of an array composed of a complete set of normalized samples and normalized antithetic samples, $\{\bar{r}, -\bar{r}\}^T$, is still equal to one. The result of these two steps is the reduction in error in the mean and variance of the individual variates that may be input to a Monte Carlo simulation.

Figure 9A:
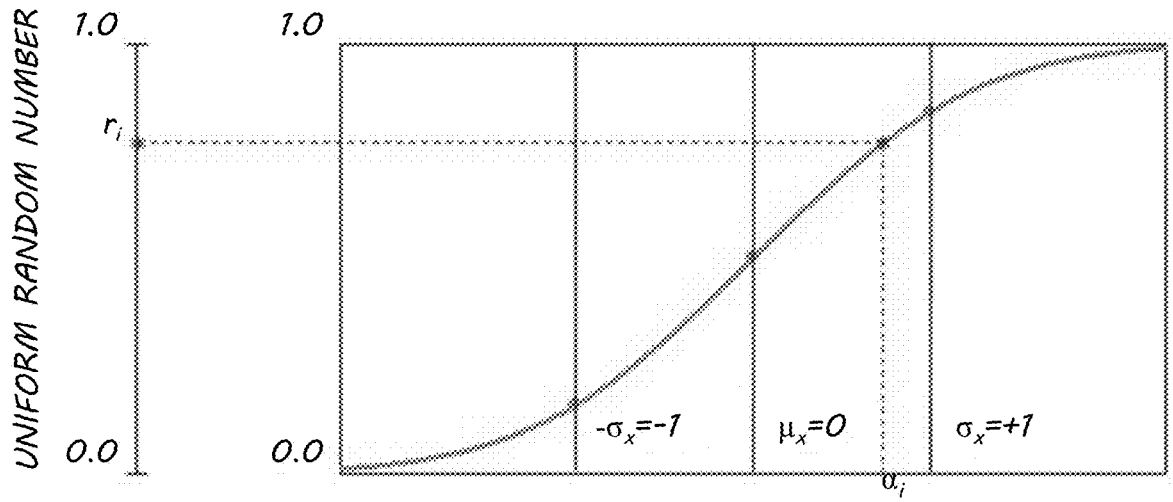
FIGS. 9A and 9B are plots of a mapping for a specified Rayleigh distribution.
Figure 9B:
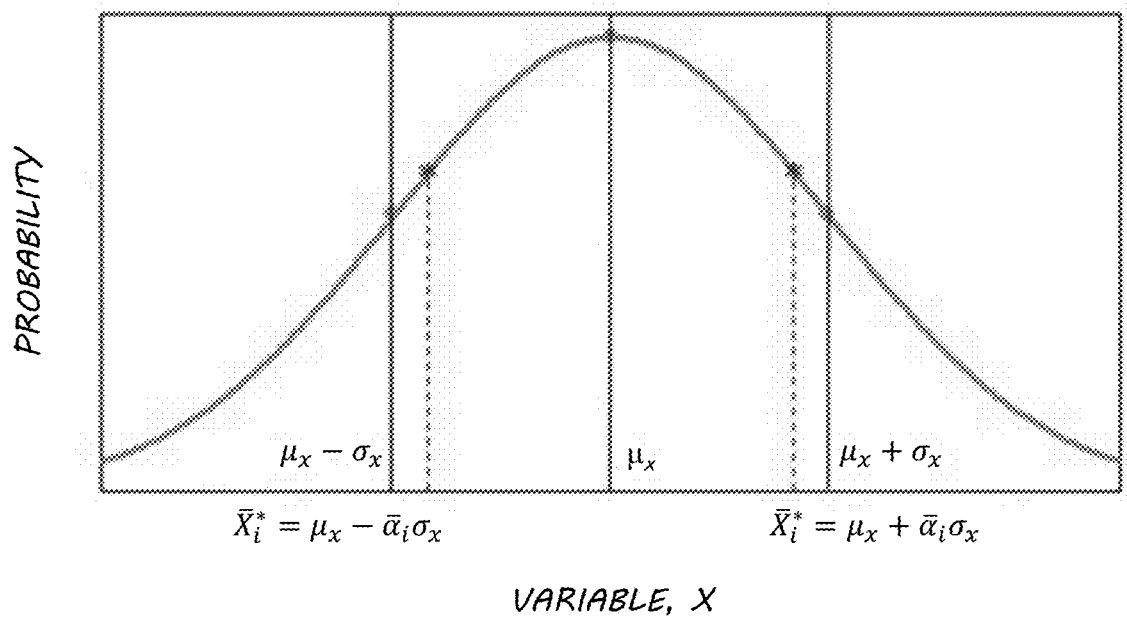

In the third component in block 48, mapping the normalized sample and normalized antithetic samples to the desired distribution, the resulting population shall accurately capture the analytic mean and variance of the distributed variable. An example of the mapping for a specified Gaussian distribution is shown in FIGS. 9A and 9B. In this mapping, a sample, $\{X_i\}$, and an antithetic sample, $\{X_i^*\}$, are produced for the prescribed probability density function. The samples are collected in the normalized distributed variable, $\{\bar{x}\}$, and the antithetic samples are collected in the normalized antithetic distributed variable, $\{\bar{x}^*\}$. In addition, a histogram of the total population will accurately represent the shape of the analytic probability density function, and can be mapped to accurately represent the shape of the analytic cumulative density function. For symmetric distributions, only the normalized sample need be mapped to the desired distribution, as the normalized antithetic sample is easily determined by mirroring about the mean of the probability density function. The combination of these three components provides a very efficient and highly accurate method and system for generating a set of random numbers with a given probability density function. This process can be repeated for multiple variates.

In the fourth component in block 50, the normalized distributed variable and the normalized antithetic distributed variable are arranged in a pattern according to Walsh, as shown in FIG. 2. This arrangement enforces orthogonality, or independence, of variates. The key is in the selection of the columns to represent the pattern of normalized distributed variable and normalized distributed antithetic variable arrays. As shown, the Walsh pattern provides independence if the column corresponding to $2^{N-1}+1$ is chosen, where N is the number corresponding the variate. So, for the first variate, the second column is chosen. For the second variate, the third column is chosen. And for the third variate, the fifth column is chosen. The fourth column is correlated to the second and third columns, and the sixth through eighth columns are all correlated to the second, third, and fifth columns.

The Walsh arrangement can also be used to enforce correlation of variates by applying the pattern to subsets of the arrays. The key is selecting a set of elements in the array to represent shared elements between variates, and patterning shared and unshared subsets according to the Walsh pattern. In this way, shared subsets will produce the higher order contributions to statistical moment generation while the unshared subsets will enforce orthogonality. One benefit of this procedure is that multiple population arrays representing correlated variates can be assembled requiring production of minimal number of base population arrays.

In the fifth component in block 50, the scaling of a function with known stochastic quantities of mean and variance for inputs and outputs, are determined. For this component of the invention, the form of a function for which Monte Carlo simulation is performed is defined. Utilizing the two-point distribution for each variate, a set of two numbers are selected where each point is located at one standard deviation away from the mean of the distribution $\mu \pm \sigma$, a population array is formed for each variate and each combination of multiplication of variates, as well as any higher order power of a variate. These population arrays are formed into a matrix that multiplies a vector of coefficients. Initial values, usually 1's, are selected for each of the coefficients. After multiplying the matrix of population arrays by the vector of coefficients, a single population array representing the output variable is formed. The population stochastic quantities of mean and variance are determined from the output population array. The error between the population mean and variance of the output and the desired or known mean and variance of the output is minimized by changes in the elements of the output population. The corresponding vector of coefficients is then determined by multiplying the output population array by the left pseudo inverse (or inverse in the case of full rank) of the matrix composed of population arrays. This method determines the scaling of coefficients for a known function with known stochastic quantities for mean and variance of the inputs and outputs.

Figure 10:
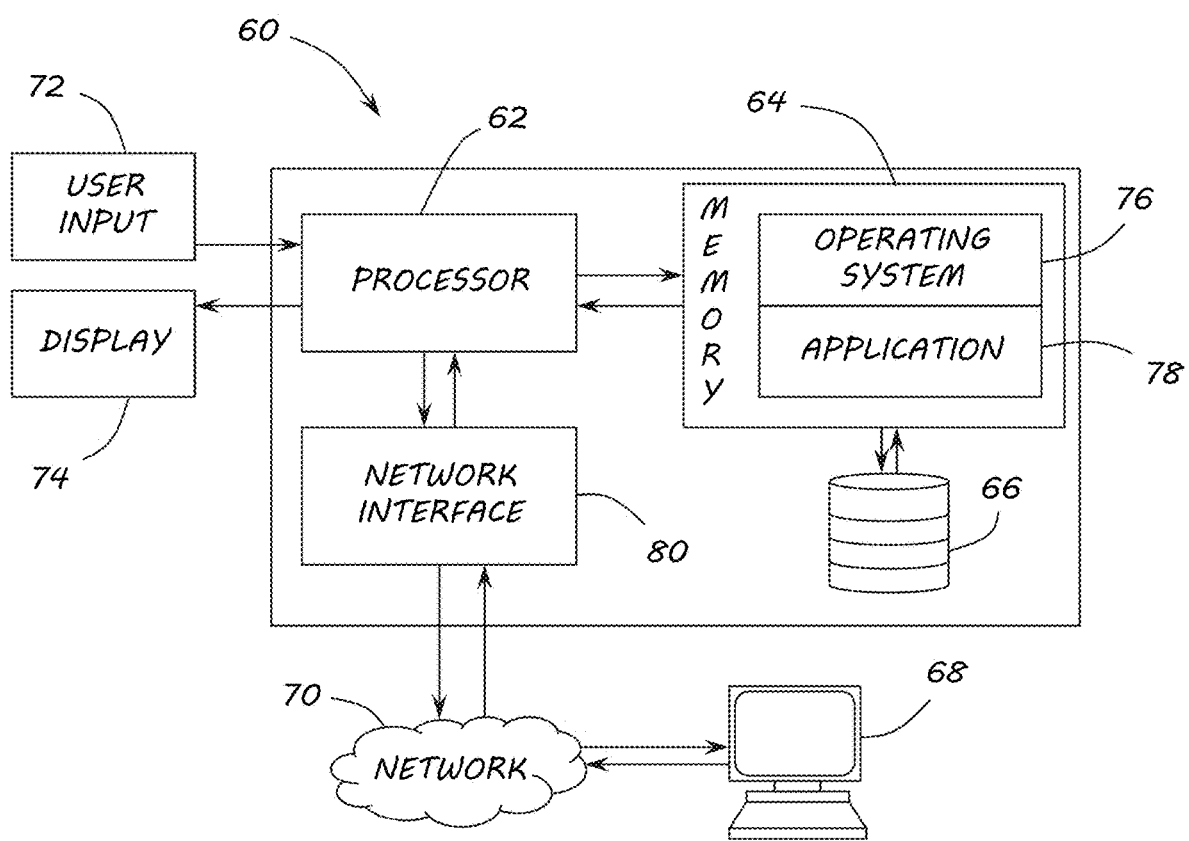
FIG. 10 is a schematic representation of an exemplary hardware and software environment for generating and analyzing random sample values consistent with the invention.

FIG. 10 illustrates an exemplary hardware and software environment for an apparatus 60 suitable for generating and analyzing random sample values in a manner consistent with embodiments of the invention. For the purposes of the invention, apparatus 60 may represent practically any computer, computer system, or programmable device, e.g., multi-user or single-user computers, desktop computers, portable computers and devices, handheld devices, network devices, mobile phones, etc. Apparatus 60 will hereinafter be referred to as a "computer" although it should be appreciated that the term "apparatus" may also include other suitable programmable electronic devices. Moreover, embodiments of the invention may be implemented in hardware in devices such as field programmable gate arrays or ASICs.

Computer 60 typically includes at least one processor 62 coupled to a memory 64. Processor 62 may represent one or more processors (e.g. microprocessors), and memory 64 may represent the random access memory (RAM) devices comprising the main storage of computer 60, as well as any supplemental levels of memory, e.g., cache memories, non-volatile or backup memories (e.g. programmable or flash memories), read-only memories, etc. In addition, memory 64 may be considered to include memory storage physically located elsewhere in computer 60, e.g., any cache memory in a processor 62, as well as any storage capacity used as a virtual memory, e.g., as stored on a mass storage device 66 or another computer 68 coupled to computer 60 via a network 70.

Computer 60 also typically receives a number of inputs and outputs for communicating information externally. For interface with a user or operator, computer 60 typically includes one or more user input devices 72 (e.g., a keyboard, a mouse, a trackball, a joystick, a touchpad, a keypad, a stylus, and/or a microphone, among others). Computer 60 may also include a display 74 (e.g., a CRT monitor, an LCD display panel, and/or a speaker, among others). The interface to computer 60 may also be through an external terminal connected directly or remotely to computer 60, or through another computer 68 communicating with computer 60 via a network 70, modem, or other type of communications device.

Computer 60 operates under the control of an operating system 76, and executes or otherwise relies upon various computer software applications, components, programs, objects, modules, data structures, etc. (e.g. application 78). The application 78, for example, may generate random sample values for a Monte Carlo simulation. Computer 60 communicates on the network 70 through a network interface 80.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory physical, recordable type media such as volatile and non-volatile memory devices, floppy and other removable disks, hard disk drives, optical disks (e.g., CD-ROM's, DVD's, etc.), among others; and transmission type media such as digital and analog communication links.

In addition, various program code described may be identified based upon the application or software component within which it is implemented in specific embodiments of the invention. However, it should be appreciated that any particular program nomenclature is merely for convenience, and thus the invention should not be limited to use solely in any specific application identified and/or implied by such nomenclature. Furthermore, given the typically endless number of manners in which computer programs may be organized into apps, routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 10 is not intended to limit the present invention. Indeed, those skilled in the art will recognize that other alternative hardware and/or software environments may be used without departing from the scope of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for generating and analyzing random sample values, the method comprising:
generating a random population array with a distribution;
generating an array of random number coefficients by decomposing the random population array distribution using mean and variance;
normalizing the array of random number coefficients;
mapping normalized samples and antithetic samples to the distribution of the random population array;
arranging the mapped, normalized samples and mapped normalized antithetic samples into a Walsh pattern;
determining a scaling of a function with known stochastic quantities of mean and variance;
utilizing a two-point distribution for each variate, selecting a set of two numbers;
forming a plurality of population arrays, forming each population array of the plurality of population arrays for each variate and each combination of multiplication of variates;
forming a matrix from the plurality of population arrays; and
multiplying the matrix by a vector of coefficients forming a single population array representing an output variable,
wherein each point of the two point distribution is located at one standard deviation away from a mean of the distribution.

2. The method of claim 1, wherein the distribution of the random population array is a uniform distribution.

3. The method of claim 2, wherein the uniform distribution of the random population array is generated such that the uniform distribution of the random population array is between 0 and 1.

4. The method of claim 1, wherein the distribution is a Gaussian distribution.

5. The method of claim 1, wherein the generation of the random population array comprises:
establishing a set of random numbers from Latin Hypercube Sampling.

6. The method of claim 1, wherein the generating an array of random number coefficients by decomposing the random population array distribution using mean and variance, further comprises:
producing data to be used to determine an accuracy of the random population array.

7. The method of claim 6, wherein a sum of elements in an array of random number coefficients equals zero.

8. The method of claim 1, wherein the mapping is a symmetric distribution.

9. The method of claim 1, wherein the arranging into a Walsh pattern enforces orthogonality.

10. An apparatus, comprising:
a memory;
a processor; and
a program code resident in the memory and configured to be executed by the processor for generating and analyzing random sample values, the program code configured to generate a random population array with a distribution, generate an array of random number coefficients by decomposing the random population array distribution using mean and variance, normalize the array of random number coefficients, map normalized samples and antithetic samples to the distribution of the random population array, arrange the mapped, normalized samples and mapped normalized antithetic samples into a Walsh pattern, determine a scaling of a function with known stochastic quantities of mean and variance, utilize a two-point distribution for each variate, selecting a set of two numbers, form a plurality of population arrays, forming each population array of the plurality of population arrays for each variate and each combination of multiplication of variates, form a matrix from the plurality of population arrays, and multiply the matrix by a vector of coefficients forming a single population array representing an output variable,
wherein each point of the two point distribution is located at one standard deviation away from a mean of the distribution.

11. The apparatus of claim 10, wherein the distribution of the random population array is a uniform distribution.

12. The apparatus of claim 11, wherein the uniform distribution of the random population array is generated such that the uniform distribution of the random population array is between 0 and 1.

13. The apparatus of claim 10, wherein the distribution is a Gaussian distribution.

14. The apparatus of claim 10, wherein the program code is configured to generate the random population array, the program code further configured to:
establish a set of random numbers from Latin Hypercube Sampling.

15. The apparatus of claim 10, wherein the program code is configured to generate an array of random number coefficients by decomposing the random population array distribution using mean and variance, the program code further configured to:
produce data to be used to determine an accuracy of the random population array.

16. The apparatus of claim 15, wherein a sum of elements in an array of random number coefficients equals zero.

* * * * *